(12) United States Patent
Bohorquez

(10) Patent No.: US 10,142,775 B2
(45) Date of Patent: *Nov. 27, 2018

(54) IDENTIFYING MOBILE DEVICE LOCATION AND CORRESPONDING SUPPORT CENTER LOCATIONS TO PROVIDE SUPPORT SERVICES OVER A NETWORK

(71) Applicant: KASEYA LIMITED, Dublin (IE)

(72) Inventor: Marco J. Bohorquez, Pembroke Pines, FL (US)

(73) Assignee: KASEYA LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,147

(22) Filed: Sep. 19, 2017

(65) Prior Publication Data

US 2018/0007506 A1 Jan. 4, 2018

Related U.S. Application Data

(63) Continuation of application No. 15/296,565, filed on Oct. 18, 2016, now Pat. No. 9,813,859, which is a continuation of application No. 14/948,334, filed on Nov. 22, 2015, now Pat. No. 9,473,349, which is a continuation of application No. 14/166,916, filed on Jan. 29, 2014, now Pat. No. 9,197,994.

(51) Int. Cl.
*H04W 24/00* (2009.01)
*H04W 4/021* (2018.01)
*H04L 12/24* (2006.01)
*H04W 64/00* (2009.01)
*H04W 4/02* (2018.01)

(52) U.S. Cl.
CPC .......... *H04W 4/021* (2013.01); *H04L 41/042* (2013.01); *H04L 41/50* (2013.01); *H04L 41/5096* (2013.01); *H04W 4/023* (2013.01); *H04W 64/003* (2013.01); *H04W 4/025* (2013.01)

(58) Field of Classification Search
CPC ... H04W 4/021; H04W 64/003; H04W 4/023; H04W 4/025; H04W 8/245; H04W 64/00; H04W 4/02; H04W 4/02; H04L 41/042; H04L 41/5096; H04L 41/50; H04M 1/72519; H04M 1/72522
USPC ......... 455/456.5, 456.1, 550.1, 418
See application file for complete search history.

(56) References Cited

U.S. PATENT DOCUMENTS 8,285,856 B1 * 10/2012 Jain .............. G06F 17/3056
709/227
2003/0187991 A1 * 10/2003 Lin .............. G06F 9/505
709/227

(Continued)

*Primary Examiner* — Danh Le

(57) ABSTRACT

A mobile device may receive updates, support and other data from a current data center agent platform. When the mobile device travels to another location the nearest data center agent may be different from the previous agent. A change-over determination must be performed prior to determining whether the new agent should be assigned to the mobile device. One example method of operation may include receiving current location information of the mobile device and identifying a present location of the mobile device and a current service center assigned to the mobile device. The method may also provide determining whether a new service center location at a remote location from the current service center location should be assigned to the mobile device based on predefined assignment criteria.

20 Claims, 7 Drawing Sheets

(56) References Cited

U.S. PATENT DOCUMENTS

| | | | |
|---|---|---|---|
| 2003/0216938 A1* | 11/2003 | Shour | G06F 19/324 |
| | | | 705/2 |
| 2006/0178917 A1* | 8/2006 | Merriam | G06Q 10/06312 |
| | | | 705/7.22 |
| 2011/0151863 A1* | 6/2011 | Shaw | H04W 24/08 |
| | | | 455/425 |
| 2012/0178483 A1* | 7/2012 | Rosenau | H04W 28/16 |
| | | | 455/509 |
| 2012/0281561 A1* | 11/2012 | Shukla | H04W 76/38 |
| | | | 370/252 |
| 2013/0103973 A1* | 4/2013 | Werth | G06F 9/5072 |
| | | | 714/2 |
| 2014/0297805 A1* | 10/2014 | Chaplot | H04L 65/608 |
| | | | 709/219 |
| 2015/0012656 A1* | 1/2015 | Phillips | H04L 47/26 |
| | | | 709/226 |

* cited by examiner

IDENTIFYING MOBILE DEVICE LOCATION AND CORRESPONDING SUPPORT CENTER LOCATIONS TO PROVIDE SUPPORT SERVICES OVER A NETWORK

CROSS-REFERENCE TO RELATED APPLICATIONS

The instant application is a continuation of and claims priority from U.S. patent application Ser. No. 15/296,565, filed Oct. 18, 2016, entitled "IDENTIFYING MOBILE DEVICE LOCATION AND CORRESPONDING SUPPORT CENTER LOCATIONS TO PROVIDE SUPPORT SERVICES OVER A NETWORK," which is a continuation of U.S. patent application Ser. No. 14/948,334, filed Nov. 22, 2015, entitled "IDENTIFYING MOBILE DEVICE LOCATION AND CORRESPONDING SUPPORT CENTER LOCATIONS TO PROVIDE SUPPORT SERVICES OVER A NETWORK," issued as U.S. Pat. No. 9,473,349 on Oct. 18, 2016, which is a continuation of U.S. patent application Ser. No. 14/166,916, filed Jan. 29, 2014, entitled IDENTIFYING MOBILE DEVICE LOCATION AND CORRESPONDING SUPPORT CENTER LOCATIONS TO PROVIDE SUPPORT SERVICES OVER A NETWORK, issued as U.S. Pat. No. 9,197,994 on Nov. 24, 2015, the entire contents of each are incorporated by reference herein.

TECHNICAL FIELD OF THE APPLICATION

This application relates to identifying a mobile device location and authentication application that monitors the mobile device location and other device attributes to identify a potential customer support center location to provide optimized support services.

BACKGROUND OF THE APPLICATION

Conventionally, a mobile device may be tracked via its IP address, base station service center, GPS coordinates, etc. The user operating the device may, in turn, receive information related to the device's current location. For example, a user may be in a particular town or city and may receive push notifications based on current weather conditions, proximity to certain services or retail outlets and/or other information, such as alerts, warnings, news, etc.

A mobile device that is connected to an enterprise network may also require certain mobility functions beyond the conventional consumer applications identified above. For example, an employee of a large enterprise corporation may be traveling around the country and may use various proprietary applications that are customized for the enterprise users. The support and related information technology and support (IT) functions required to access and maintain connectivity to those applications may be required at any particular time and at any particular geographical location. However, a user's customary support site/server may be in a remote location that is no longer the most optimal support site for a traveling customer operating a mobile device.

SUMMARY OF THE APPLICATION

One embodiment of the present application may include a method that provides receiving current location information of a mobile device, identifying a present location of the mobile device and a current service center assigned to the mobile device, determining whether a new service center location at a remote location from the current service center location should be assigned to the mobile device based on predefined assignment criteria, and assigning the mobile device to the new service center location.

Another example embodiment of the present application provides an apparatus that includes a receiver configured to receive current location information of a mobile device, and a processor configured to identify a present location of the mobile device and a current service center assigned to the mobile device, determine whether a new service center location at a remote location from the current service center location should be assigned to the mobile device based on predefined assignment criteria, and assign the mobile device to the new service center location.

DETAILED DESCRIPTION OF THE APPLICATION

Figure 1:
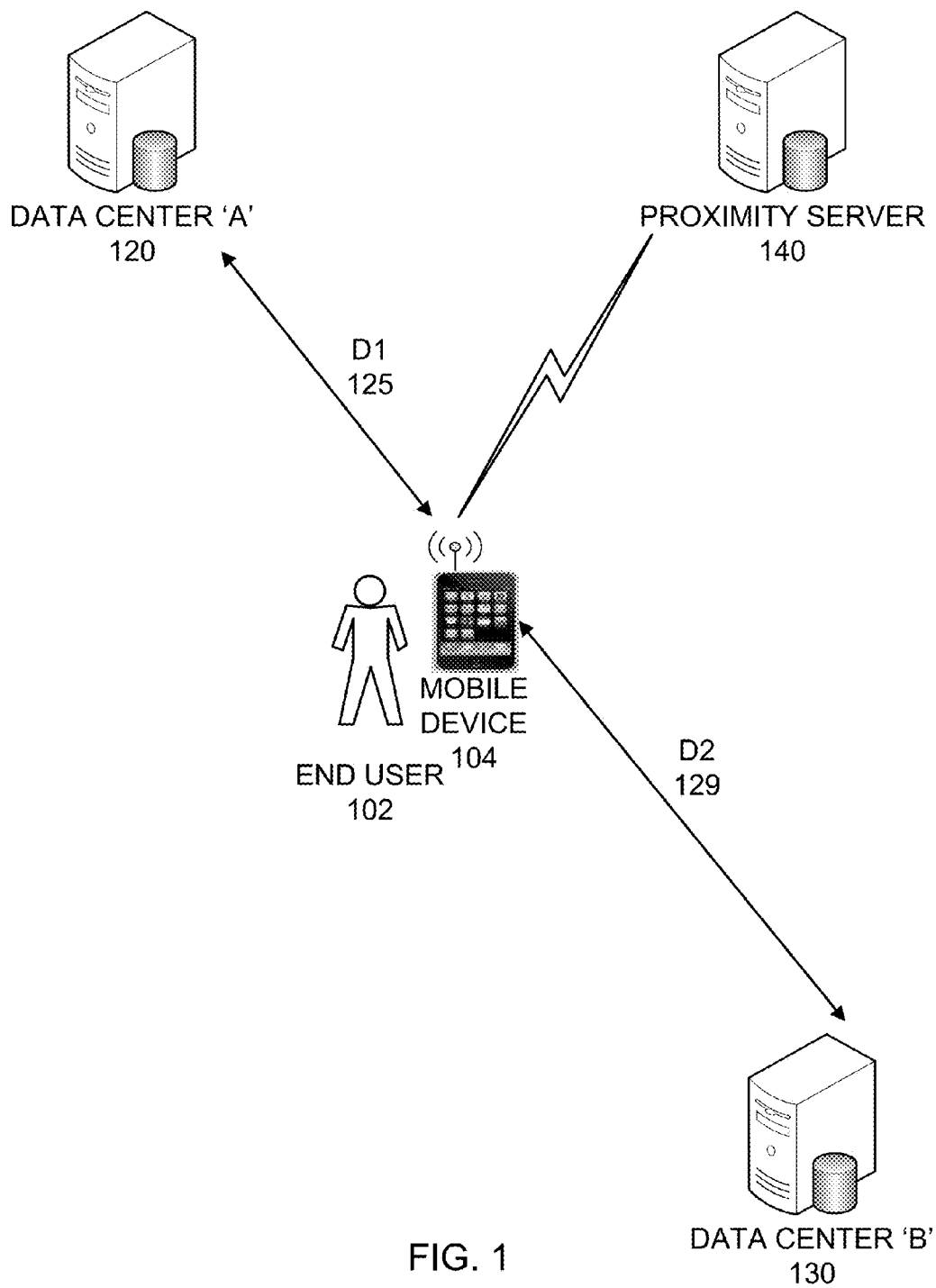
FIG. 1 illustrates an example network configuration, according to example embodiments of the present application.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

According to example embodiments of the present application, an administrator may be any information technology (IT) systems administrator, IT service provider, and/or computer owner/operator who provides administrative functions to the computer devices, communication based connections and other network resources. An administrator machine may be any network-connected computer device operated by the administrator. The administrator machines may be connected directly to a server machine, or over a remote network connection to a server, managed machines and other computer networking machines.

An administrator application may be a web-based application that permits the administrator machine, a server, etc., to manage one or more remotely managed machines. A secure network channel may be setup and established between the administrator machine and the managed machine via the administrator application. The secure network channel may provide connections over which data packets may be exchanged. The network channel may pass through a wide area network (WAN) (e.g. the Internet) or through a private local area network (LAN).

An agent application may be an application that includes a process operating on the remote administrator machine and/or another process operating on an active user interface on the remotely managed device (e.g., laptop, computer, smartphone, mobile device, etc.). The agent application accepts connections from the administrator application and assists with initiating a channel and transmitting and receiving commands and data. An administrator plug-in may be a browser plug-in operating in the context of the administrator application that connects with and interacts with the agent process of the administrator machine over the existing network channel to the agent application of the managed machine. The administrator machine may be a server providing automated processing and/or a personal computing device operated by an administrator IT personnel, etc.

According to one example embodiment, a mobile device may be operated as part of a local area network, mobile communication network, wide area network or other communication network. The mobile device may be operating according to a 3G/4G data communication scheme and may be communicating over the Internet to support center servers, location servers, and other IT infrastructure communication nodes to provide ongoing data, support services and other functions to the mobile device users.

Large enterprise corporations may have access to large-scale IT server networks with help centers around the country or even the world. The mobile device may require localized assistance or may be communicating with one service agent computer/server and may be traveling towards another service agent machine via an automobile, train, walking, etc. In such cases, it may be prudent to evaluate the type of service the mobile device is using, the bandwidth requirements, the communication frequency, the urgency or importance of the data, etc.

FIG. 1 illustrates an example communication network 100 according to example embodiments. Referring to FIG. 1, the user 102 may be operating a mobile device 104 that is located in the field (e.g., any location outside a fixed network location). The mobile device 104 may have a current connection with a data center 'B' 130. The present distance D2 129 may be larger than a distance to another site of data center 'A' 120. The distance to data center 'A' 120 may be D1 125 which is only 50 miles as opposed to D2 which is 100 miles. As a result, a web-based web service may serve as a communication bridge between the server agents and the mobile device 104. The location tracking and decision service may be initiated by a third party service that acknowledges the GPS coordinates of the mobile device 104 via a javascript object notation (JSON) format and identifies requests for services.

The JSON data format may be used to provide the location services and may include an agent ID, an agent type, which can represent a computer, server or mobile device, a timestamp, composed of a date and time and/or a GPS location, including latitude and longitude. Messages shared between the proximity service server 140 and the agent nodes 120 and 130 will use the same format. The service may process messages and use the message type, timestamp, and location to determine the distance and speed a mobile device is from other agents or devices. The service determines this information by comparing every newly received message with previously stored messages. Calculations for distance and speed can be made using a simple distance and speed formula. A device with an agent application installed and/or a mobile application can transmit a message to the service at any point in time. After the service acknowledges the message, the service is then aware of the mobile device geo-location and proximity to other potentially nearby data center agents.

According to one example, if the mobile device 104 is within a given distance of an agent data center 120, 130, etc., a notification can be sent from the service server 140 to the mobile device 104 with specific information about nearby service agents or services, via the device notifications system or direct from the agent centers 120 or 130. A mobile device 104 with GPS capabilities and a software client agent installed may provide such information when the mobile device 104 changes its movement in location from somewhere in between the two data centers 120 and 130. For example, the agent application may transmit the location information as a location update message to the first data center 120 to record the movement. If the device 104 begins to travel away from 'A' 120 and closer to 'B' the service application determines the device 104 is closing-in on the distance to 'B', the agent application operating in the mobile device 104 or the corresponding mobile application will now become enabled to begin receiving notifications and information from agents in the 'B' location 130.

Figure 2:
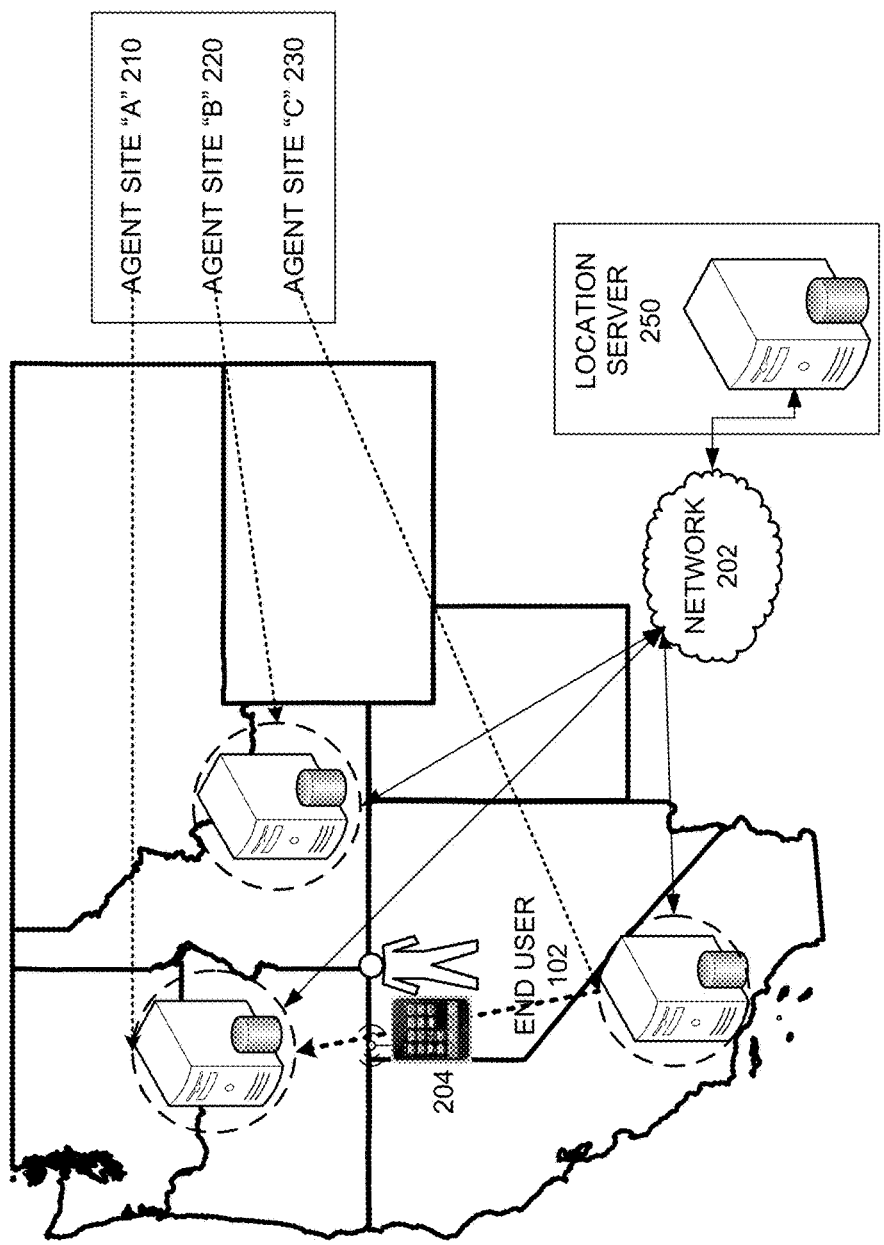
FIG. 2 illustrates an example of a user device being located and assigned an agent, according to example embodiments of the present application.

FIG. 2 illustrates an example mobile device movement scenario according to example embodiments. Referring to FIG. 2, the mobile device 204 may be operating in the southern California region and may be moving towards Portland Oreg. Both sites in California and Oregon have a service agent center 230 and 210, respectively. At some point in the driving example of a user driving from one site towards another, the application function(s), support and related data messages may be more optimal if handled by the other data center due to a change in proximity from one site to the other. A location server 250 may maintain coordinates of the mobile device from GPS data or other information, such as a base station identifier and location or other tracking mechanisms. The distance from one site to another may be recalculated each time a distance estimate is performed by the agent application. The distance threshold for changing from one site to another may be a 49/51% distance ratio or may utilize a larger hysteresis threshold that is greater than 1% such as 3% or 5% or even 20% of a distance to reduce a 'ping-pong' effect. For example, the mobile device must actually be 5% closer to the next site then the previous site (e.g., 45 miles away from new site vs. 55 miles away from current site) before a changeover occurs assuming the hysteresis is 5%. Other sites may offer additional options for a traveling mobile device, such as site 220 in Idaho. The network 202 may be used by the location server 250 to weigh all the options prior to performing a changeover by calculating a weighted function of all service support centers based on variables, such as distance, type of problem, user's home support center, etc.

Figure 3A:
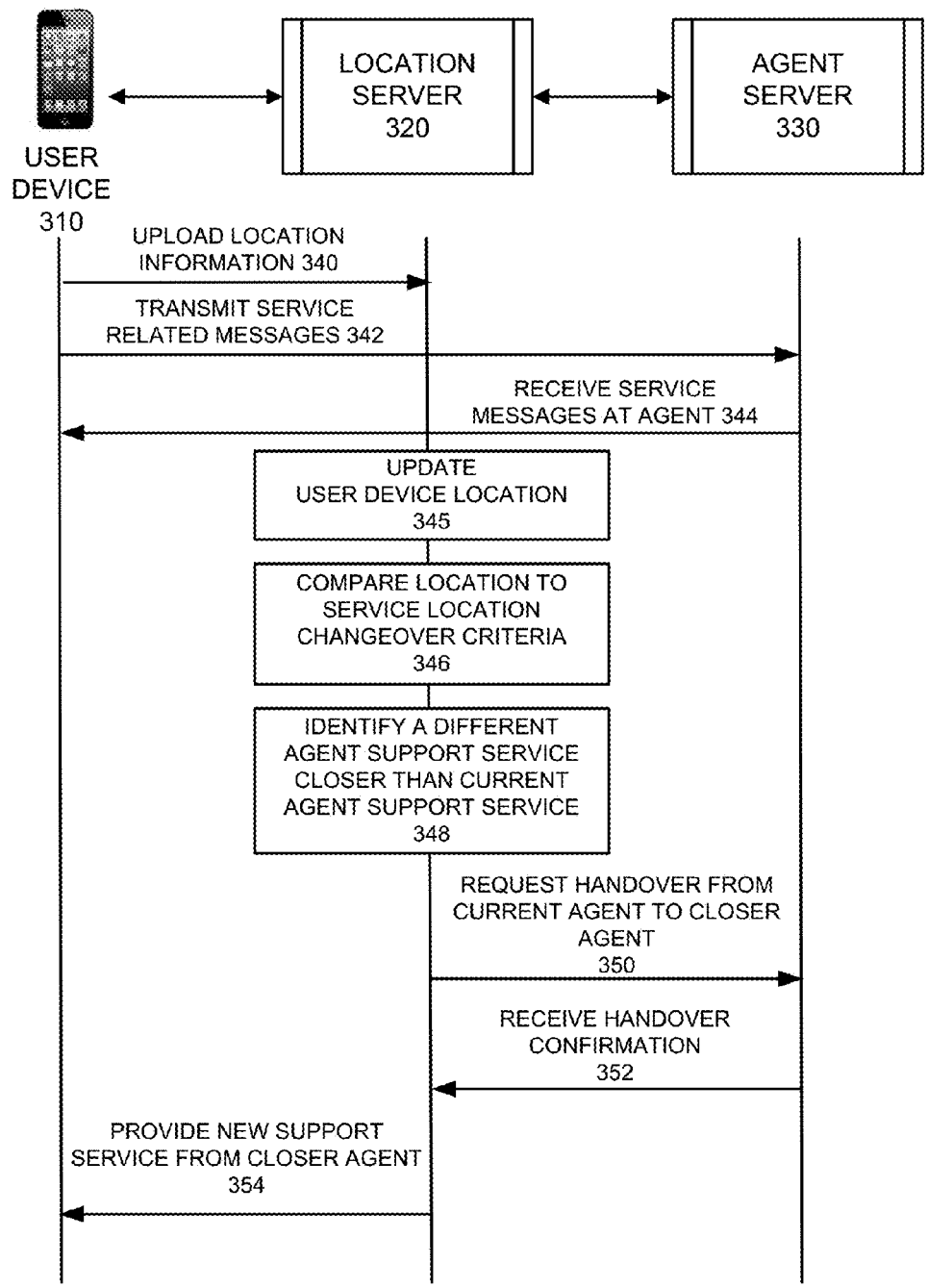
FIG. 3A illustrates an example communication system signaling diagram of a mobile device agent application according to example embodiments.

FIG. 3A illustrates an example communication system signaling diagram of a mobile device agent application according to example embodiments. Referring to FIG. 3A, the signaling example 300 includes a user device 310 communicating with a location identification server 320 and an agent server 330 which provides live support to the mobile device. In operation, the location server 320 may be a separate server or a separate processing module of the same server as the agent server 330.

In operation, the mobile device 310 may upload information about its location 340 periodically to the location server service 320. The location may change and this may be the basis for a changeover from one support center to another support center. Service related messages 342 may be sent to the present support server 330 to receive support for any type of service either via customer support, background updates, etc. The mobile device agent function may receive messages 344 related to the present support effort. As periodic location information is received via GPS or other location identification functions, the user device location may be updated 345 and compared 346 to other service sites applicable to the user application or device. Also, other changeover criteria may be explored in order to determine whether to perform the changeover as illustrated in FIG. 3B.

In the event that a closer support center is identified 348 via distance, network cost utilization (i.e., device hops, bandwidth requirements, network cost utilization, etc.) and/or other factors, then the changeover may be triggered to a closer agent or a more appropriate support center given the distance and/or other factors. As a result, the request for the changeover may be initiated 350 and the handover may be confirmed 352 and a new service center may be utilized 354.

Figure 3B:
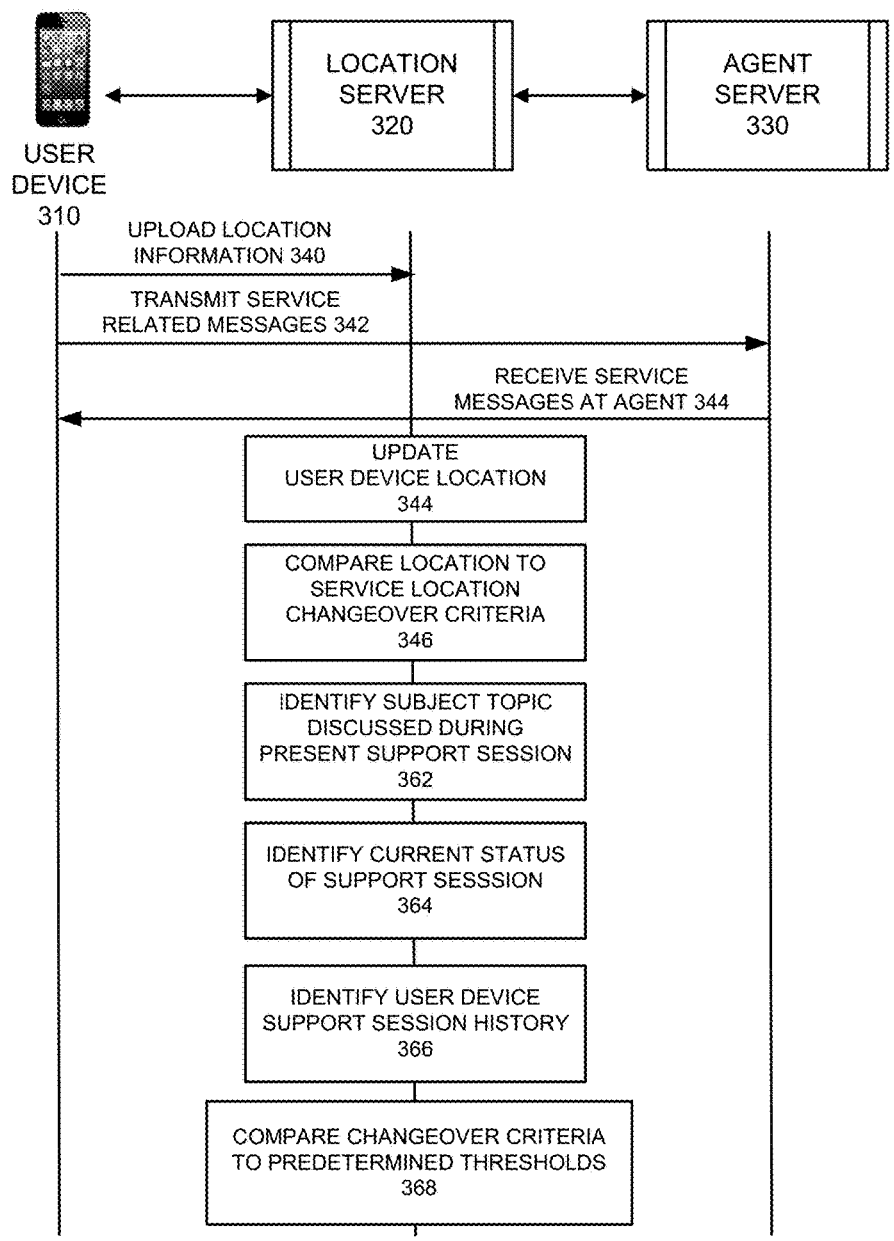
FIG. 3B illustrates another example communication system signaling diagram of a mobile device agent application according to example embodiments.

FIG. 3B illustrates another example communication system signaling diagram of a mobile device agent application according to example embodiments. In FIG. 3B, the sequence of operations 360 begin the same as those in FIG. 3A, however, the changeover considerations are reanalyzed for additional considerations and factors prior to engaging in a changeover. For example, first a subject topic of a live session may be analyzed 362 and the agent service personnel at the initial support center, the new support center, other support centers may be logged in a subject content file for each facility and referenced to identify whether the personnel are qualified to assist the mobile device in the event of a changeover. If not, then that particular support center may be disregarded. Next, a current status of the support session 364 may be identified and if the support session is believed to be more than a predetermined threshold complete, then that session may be disregarded from consideration. Thresholds may include, for example 50% completion, 60% completion, 75% completion, or more. In such a case, the changeover may be considered counterproductive even though network resources may be alleviated due to a closer facility. Progress of a session may be based on time, personnel logging the session, or certain milestones of the session being reached. Other factors may include the user's session history 366, for example, whether the user device has been serviced by that facility before or not. If so, the changeover may be performed accordingly, and if not, the changeover may be disregarded. All the above-noted examples may be performed based on a particular threshold value 368 of certainty, completion or other variables used to make a changeover determination.

Figure 4:
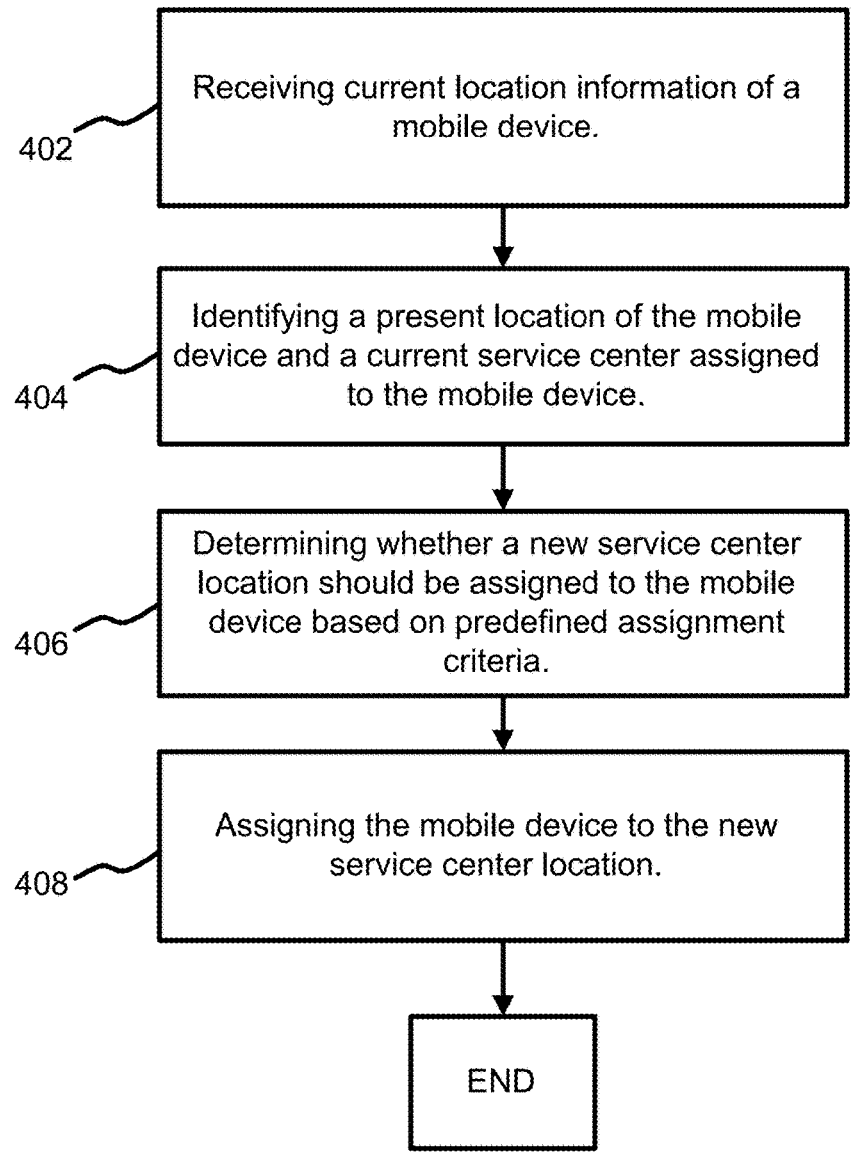
FIG. 4 illustrates a flow diagram of an example method according to an example embodiment of the present application.

FIG. 4 illustrates an example flow diagram of an example method of operation according to example embodiments. Referring to FIG. 4, the example method may include receiving current location information of a mobile device at operation 402 and identifying a present location of the mobile device and a current service center assigned to the mobile device at operation 404. The method may also include determining whether a new service center location at a remote location from the current service center location should be assigned to the mobile device based on predefined assignment criteria at operation 406. The assignment criteria is generally related to optimizing network and communication performance, which is primarily based on distance, likelihood of success and other factors. Changeovers should only be performed when the user device can still benefit from the effort. The method then includes assigning the mobile device to the new service center location at operation 408.

Figure 5:
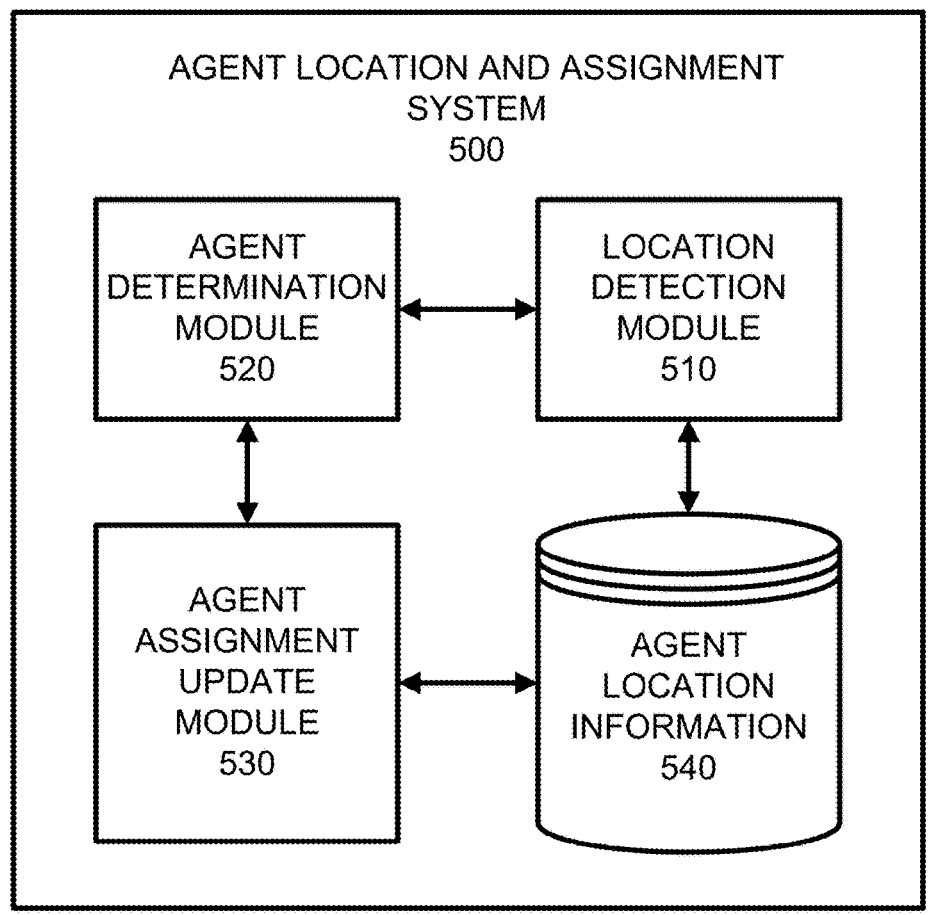
FIG. 5 illustrates a system configuration that is configured to perform one or more operations corresponding to the example embodiments.

FIG. 5 illustrates a system configuration that is configured to perform one or more operations corresponding to the example embodiments. Referring to FIG. 5, the agent location and assignment system 500 may include a location detection module 510 which receives current location information of a mobile device and determines the present location of the support service via module 520 and the present location of the prospective support center(s). The system may then provide identifying a present location of the mobile device and a current service center assigned to the mobile device via the agent determination module 520. The agent assignment module 530 may then determine whether a new service center location at a remote location from the current service center location should be assigned to the mobile device based on predefined assignment criteria and then assign the mobile device to the new service center location. All information used to make the determination decisions is stored in an agent location information database 540.

According to other examples, the system 500 may perform identifying the mobile device is presently communicating with the current service center and is receiving support messages of a first predetermined subject topic, and identifying a plurality of other service center locations different from the current service center location and selecting other service center locations which are associated with the first predetermined subject topic. The system may then perform determining whether the other service center locations are closer in distance to the mobile device location than the current service center location. These determinations may provide the basis for a changeover operation.

The system may then determine whether a new service center location at a remote location from the current service center location should be assigned to the mobile device based on predefined assignment criteria by identifying a current status of the support session, and also by determining whether a current status of the support session indicates that the support session is near completion. As a result, if the support session is near completion then the current support session with the current support center can be maintained, and if the support session is less than a predetermined threshold of completion then reassigning the support session to the new service center location which is closer in distance. The threshold may be anywhere between 51% and 99% completion.

The predefined assignment criteria may be a location between the mobile device and the current support center, a subject topic being discussed in the support session, a current completion status of the support session, and a previous session occurrence between the mobile device and the current support center. Also, when assigning the mobile device to the new service center location the mobile device may be assigned to the new support center while the current support center session is still operating so the device is receiving simultaneous support from two or more support centers until the support centers decide the device is ready to be serviced by only one support center.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example network element 600, which may represent any of the above-described network components, etc.

Figure 6:
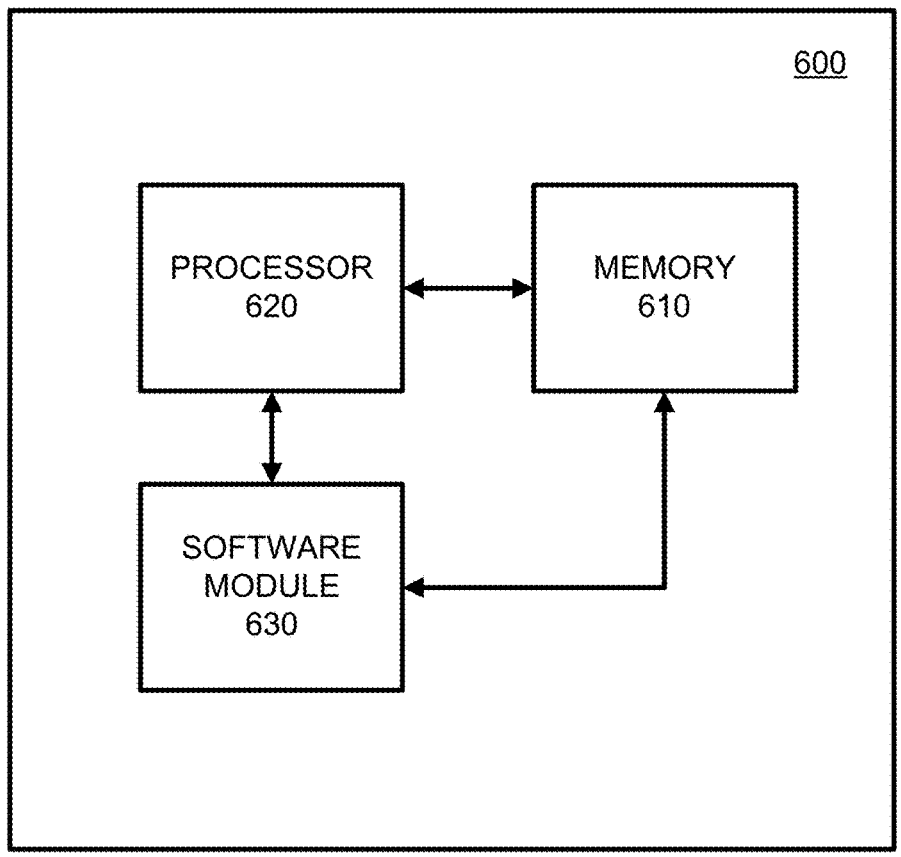
FIG. 6 illustrates an example network entity device configured to store instructions, software, and corresponding hardware for executing the same, according to example embodiments of the present application.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system of FIG. 5 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
identifying a present location of a mobile device and a current service center assigned to the mobile device;
assigning the mobile device to a new service center location at a remote location from the current service center location based on:
determining whether a current status of a support session indicates that the support session is near completion;
maintaining the current support session with the current support center if the support session is near completion; and
reassigning the support session to the new service center location which is closer in distance if the support session is not near completion.

2. The method of claim 1, further comprising:
identifying the mobile device is presently communicating with the current service center and is receiving support messages of a first predetermined subject topic;
identifying a plurality of other service center locations different from the current service center location;
selecting at least one other service center location among the plurality of other service center locations which is associated with the first predetermined subject topic; and
determining whether the at least one other service center location is closer in distance to the mobile device location than the current service center location.

3. The method of claim 1, further comprising receiving current location information of a mobile device.

4. The method of claim 1, wherein the assigning the mobile device to a new service center location at the remote location from the current service center location is based on predefined assignment criteria, wherein the predefined assignment criteria is at least one of a location between the mobile device and the current support center, a subject topic being discussed in the support session, a current completion status of the support session, and a previous session occurrence between the mobile device and the current support center.

5. The method of claim 1, wherein assigning the mobile device to the new service center location comprises assigning the mobile device to the new support center while the current support center session is still operating.

6. The method of claim 5, wherein the assigning the mobile device to the new support center comprises assigning at least one user support agent of the new support center to the mobile device while the present support agent of the current support center is still assigned to the mobile device via the current support session.

7. The method of claim 6, further comprising discontinuing the current support center from the current support session once the new support center agent and the present support agent have confirmed the new support center has control of the current support session.

8. An apparatus, comprising:
a processor configured to:
identify a present location of a mobile device and a current service center assigned to the mobile device;
assign the mobile device to a new service center location at a remote location from the current service center location based on:
determine whether a current status of a support session indicates that the support session is near completion;
maintain the current support session with the current support center if the support session is near completion; and
reassign the support session to the new service center location which is closer in distance if the support session is not near completion then.

9. The apparatus of claim 8, wherein the processor is further configured to:
identify the mobile device is presently in communication with the current service center and is in receipt of support messages of a first predetermined subject topic;
identify a plurality of other service center locations different from the current service center location;
select at least one other service center location among the plurality of other service center locations which is associated with the first predetermined subject topic; and
determine whether the at least one other service center location is closer in distance to the mobile device location than the current service center location.

10. The apparatus of claim 8, comprising a receiver configured to receive current location information of a mobile device.

11. The apparatus of claim 8, wherein the predefined assignment criteria is at least one of a location between the mobile device and the current support center, a subject topic being discussed in the support session, a current completion status of the support session, and a previous session occurrence between the mobile device and the current support center.

12. The apparatus of claim 8, wherein the processor being configured to assign the mobile device to the new service center location comprises the processor also being configured to assign the mobile device to the new support center while the current support center session is still in operation.

13. The apparatus of claim 12, wherein the processor being configured to assign the mobile device to the new support center comprises the processor being configured to assign at least one user support agent of the new support center to the mobile device while the present support agent of the current support center is still assigned to the mobile device via the current support session.

14. The apparatus of claim 13, wherein the processor is further configured to discontinue the current support center from the current support session once the new support center agent and the present support agent have confirmed the new support center has control of the support session.

15. A non-transitory computer readable storage medium configured to store instructions that when executed cause a processor to perform:

identifying a present location of a mobile device and a current service center assigned to the mobile device;

assigning the mobile device to a new service center location at a remote location from the current service center location based on:

determining whether a current status of a support session indicates that the support session is near completion;

maintaining the current support session with the current support center if the support session is near completion; and reassigning the support session to the new service center location which is closer in distance if the support session is not near completion.

16. The non-transitory computer readable storage medium of claim 15, wherein the processor is further configured to perform:

identifying the mobile device is presently communicating with the current service center and is receiving support messages of a first predetermined subject topic;

identifying a plurality of other service center locations different from the current service center location;

selecting at least one other service center location among the plurality of other service center locations which is associated with the first predetermined subject topic; and determining whether the at least one other service center location is closer in distance to the mobile device location than the current service center location.

17. The non-transitory computer readable storage medium of claim 15, comprising receiving current location information of a mobile device.

18. The non-transitory computer readable storage medium of claim 15, wherein the predefined assignment criteria is at least one of a location between the mobile device and the current support center, a subject topic being discussed in the support session, a current completion status of the support session, and a previous session occurrence between the mobile device and the current support center.

19. The non-transitory computer readable storage medium of claim 15, wherein assigning the mobile device to the new service center location comprises assigning the mobile device to the new support center while the current support center session is still operating.

20. The non-transitory computer readable storage medium of claim 19, wherein the assigning the mobile device to the new support center comprises assigning at least one user support agent of the new support center to the mobile device while the present support agent of the current support center is still assigned to the mobile device via the current support session and discontinuing the current support center from the current support session once the new support center agent and the present support agent have confirmed the new support center has control of the support session.

* * * * *